A. STARK,
Wardrobe Bedstead.
No. 8,161. Reissued April 9, 1878.
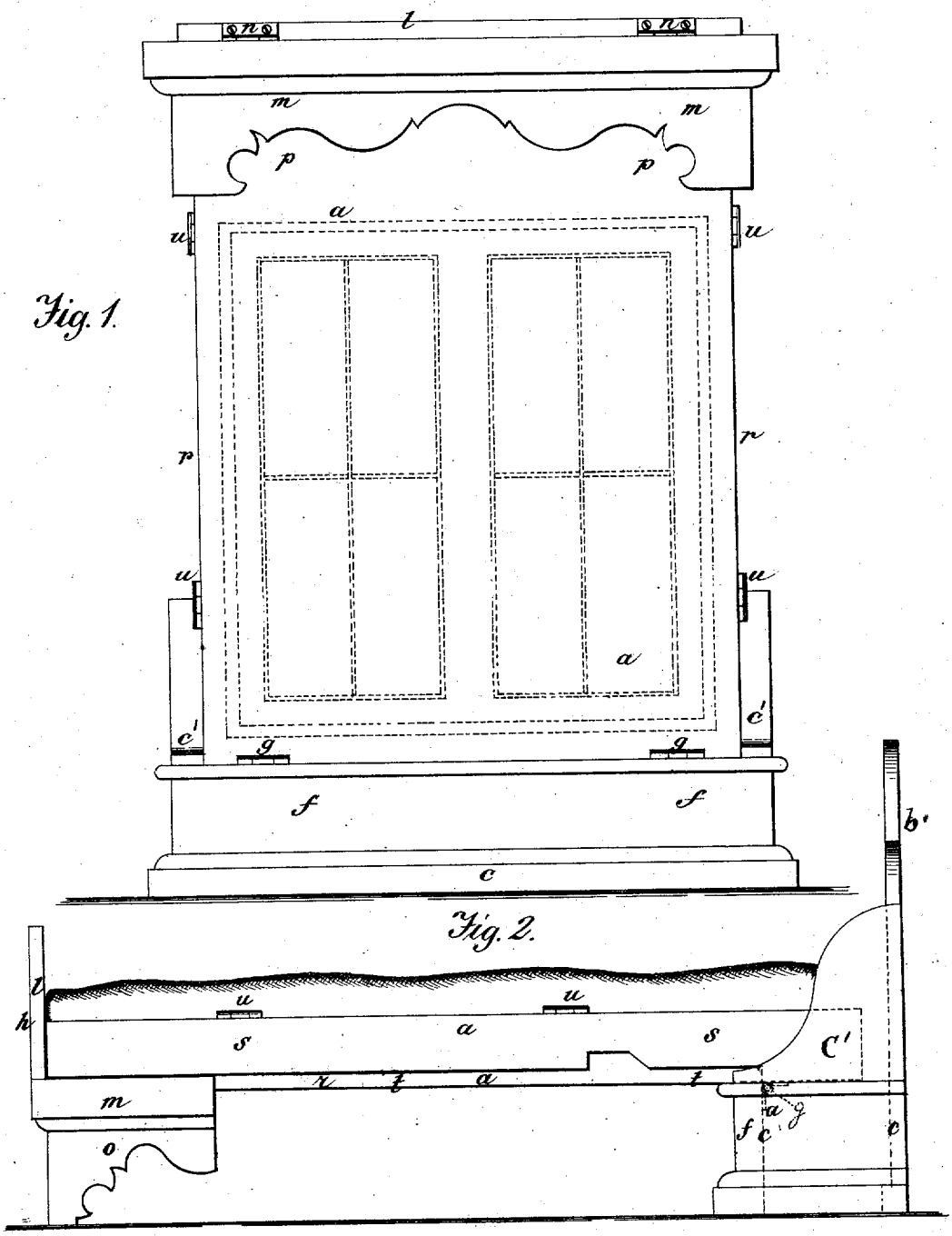
Witnesses.
A. Ruppert
J. G. Maum.
A. Stark
Inventor.
D. P. Holloway & Co.
Attys
N. PETERS, PHOTO-LITHOGRAPHER, WASHINGTON, D. C.

UNITED STATES PATENT OFFICE.

ANDREW STARK, OF TOPEKA, KANSAS.

IMPROVEMENT IN WARDROBE-BEDSTEADS.

Specification forming part of Letters Patent No. 49,568, dated August 22, 1865; Reissue No. 8,161, dated April 9, 1878; application filed March 14, 1878.

*To all whom it may concern:*

Be it known that I, ANDREW STARK, of Topeka, in the county of Shawnee and State of Kansas, have invented new and useful Improvements in Convertible or Wardrobe Bedsteads, of which the following is a specification:

This invention relates to that class of bedsteads in which the bed is hinged to a frame, which permits it to be extended, resting upon the floor, so as to serve the functions of a bedstead, but which may be turned into a vertical position, thus concealing the mattress and bedding, and giving to the article a neat, tasty, and pleasing exterior.

In the annexed drawings, making a part of this specification, Figure 1 is a front elevation, showing the bedstead as turned up and presenting the external appearance of a wardrobe. Fig. 2 is a side elevation, showing the bedstead as extended, resting upon the floor, and ready to serve the purposes of a bed.

The same letters are employed in both figures in the indication of identical parts.

*a a* in the drawings represent the bed portion of the bedstead, made in the form of a square box, in which the mattress and other bedding are inserted in the usual manner; *b*, the head-board, made in any suitable shape, size, and material, to the lower portion of which, and projecting from the inner side thereof, a wide base, *c f*, is attached, made hollow, and ornamented upon its exterior with molding beads, or with trimmings or ornaments of any suitable kind and style.

The width of the space within the base is equal, or nearly so, to the thickness of the bed portion *a*, which is secured to the inner edge of the upright portion of the base by hinges *g g*, so that it can be turned upon the same into a vertical position, as represented, Fig. 1, bringing the head-board against the bedding, where it can be secured, if desired, by hooks or in any other proper manner, the lower end of the bed portion entering the hollow base *c*. The base *c* is extended on the sides by brackets *c'*, which are fastened to the head-board *b*, and serve as braces to strengthen the head-board, and also to conceal the folding bed, which, when raised, folds in between these brackets.

*h* is the foot-board, formed in two parts, *l* and *m*, hinged together at *n n*. To the lower portion *m* is attached at each end a side piece, *o*, the portion *m* and side pieces *o o* being made of an ornamental shape, as represented in the drawing. The lower part *m* of the foot-board is hinged to the foot of the bed portion *a a*, and when the bedstead has been turned up into a vertical position, as described, is swung down against the outer portion *p* of the same, and its upper part *l* over and upon the upper end of the bed portion, as seen in Fig. 1, thus forming a neat and tasty top piece therefor, forming the cornice for the apparent wardrobe both on the front and sides thereof, the foot-piece being extended around the angles of the foot of the bed, so as to give this finish to the top when the bed is turned up.

The side pieces *r r* of the bed portion *a a* are divided in the direction of their length into parts *s* and *t*, hinged together at *u u*, the upper one, *s*, of which, when the bedstead is in a horizontal position, is turned down and upon the upper ends of the base portion *c* of head-board and side pieces *o o* of foot-board, and securely holding them in their proper position, and preventing them from overturning, which would occur were the side pieces not so constructed, or were there no arrangement of devices provided for holding the same in position, as described.

In bedsteads of this class heretofore known the body of the wardrobe or other article of furniture intended to be represented by the bedstead when folded up has been represented by the frame and cornice attached to that part of the structure which represented the head-board of the bed when extended, which folded under the cornice into the space. In consequence, when the bed was extended, the appearance of the head-board with its cornice has been heavy, and, being necessarily very high, in order that it might receive the bed, it lacked the graceful proportions which are demanded by people of taste in furnishing their houses.

My invention is distinguished from all previously known convertible beds of this class in this, that in mine the head-board, when the bed is elevated, is entirely concealed, (except upon the sides,) and, as it does not carry the cornice, may be made shorter than the bed and have whatever finish and proportions may be desired.

In other cases the foot-piece has been hinged to the bed frame or box, and made to turn as the bed was raised, so as to form part of the finish of the front of the apparent wardrobe; but my invention is distinguished from this, that the foot-piece, when raised, instead of forming part of the front under the cornice, as in such former cases, forms the entire cornice, all parts of the front of the apparent wardrobe which are visible when the bed is raised above the base belonging to the swinging part of the structure. As a consequence of this construction, when the bed is down, the foot-piece, as well as the head-piece, may be made of any desired form or proportion, and consequently a natural and ordinary appearance is given to the bedstead when extended for use.

In other beds of this class the cornice has been supported, in part, by side pieces of the frame of the head part of the bed, forming a casing or open box, into which the bed is folded. My invention is distinguished also from these in this, that I make the cornice part of the foot-piece of the folding bed. The ends of the apparent wardrobe are formed by the ends of the foot-piece, forming the cornice, the sides of the bed-box itself, which is exposed to view, the side brackets of the base, which brace the head-piece, but are not connected with the cornice, and the ends of the base.

I have spoken of the parts which are respectively represented as head and foot pieces; but it is not my design to employ these as terms of limitation, for they may be reversed, and either may be head or foot pieces.

I am aware that in English Patent No. 2,310, of 1853, a convertible bed is found in which both the front and ends of the cornice are formed by a piece hinged to the foot of the bed, so that, while supporting the foot when the bed is turned down, it can be turned up above the foot when the bed is raised into its vertical position.

It will be observed that this differs from my construction, among others, in the following particulars: First, the foot-board proper and the foot-piece forming the legs are not connected, and cannot be, as the foot-board folds down onto the bed when it is arranged to be raised; second, as the foot-piece is turned up, it necessarily adds its entire height to that of the bed, while mine adds little or nothing; third, because both faces of the foot-piece in that case require to be finished, as one surface is exposed when the legs are turned down, and the opposite face when they are turned up to form a cornice.

What I claim as my invention, and desire to secure by Letters Patent, is—

1. In a convertible wardrobe-bedstead, the combination of a permanent head-board, *b*, and box or base *c f*, attached at the bottom thereof, and receiving into it the lower end of the bed when raised, the bed hinged to said base, and foot-piece hinged thereto in such manner that when the bed is folded up the foot-piece can be turned down so as to form the entire cornice or top of the apparent wardrobe, substantially as set forth.

2. In a convertible or wardrobe bedstead, in combination with the folding bed, a downwardly-folding foot-piece hinged thereto, which is extended around the corners of the bed, so as to form, when the bed is folded up and the foot-piece is turned down, the entire cornice on both the front and two ends of the apparent wardrobe, substantially as set forth.

3. In a convertible or wardrobe bedstead, in combination with the head-board *b* and box *c*, the side brackets *c'*, forming a support for the head-piece, and also, in combination with the sides of the bed-box and end of the folding foot-piece, forming the sides of the apparent wardrobe, substantially as set forth.

4. The combination of the hinged bed portion *a*, hollow base *c*, the two-part foot-boards *l m*, and the double hinged side pieces *s t*, when arranged in the manner and for the purposes herein described.

In testimony whereof I hereby sign my name this 27th day of February, 1878.

ANDREW STARK.

Witnesses:

OWEN D. ROBERTS,

J. B. KILBURN.